United States Patent
Kondo et al.

(10) Patent No.: US 10,294,633 B2
(45) Date of Patent: May 21, 2019

(54) HYDRAULIC DRIVE SYSTEM OF CONSTRUCTION MACHINE

(71) Applicant: KAWASAKI JUKOGYO KABUSHIKI KAISHA, Kobe-shi, Hyogo (JP)

(72) Inventors: Akihiro Kondo, Nishinomiya (JP); Yoji Yudate, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 280 days.

(21) Appl. No.: 15/513,727

(22) PCT Filed: Oct. 9, 2015

(86) PCT No.: PCT/JP2015/005133
§ 371 (c)(1),
(2) Date: Mar. 23, 2017

(87) PCT Pub. No.: WO2016/056244
PCT Pub. Date: Apr. 14, 2016

(65) Prior Publication Data
US 2017/0306590 A1 Oct. 26, 2017

(30) Foreign Application Priority Data
Oct. 10, 2014 (JP) .................................. 2014-209279

(51) Int. Cl.
*E02F 9/22* (2006.01)
*F15B 21/14* (2006.01)
(Continued)

(52) U.S. Cl.
CPC ............ *E02F 9/123* (2013.01); *E02F 9/2235* (2013.01); *E02F 9/2285* (2013.01);
(Continued)

(58) Field of Classification Search
CPC ........... E02F 9/123; F16H 61/46; F16H 61/47
(Continued)

(56) References Cited

U.S. PATENT DOCUMENTS

| 9,624,647 B2* | 4/2017 | Yamashita | E02F 9/123 |
| 9,920,780 B2* | 3/2018 | Ueda | F15B 11/04 |
| 2017/0016208 A1* | 1/2017 | Saitoh | E02F 9/22 |

FOREIGN PATENT DOCUMENTS

JP 2003-120616 A 4/2003

OTHER PUBLICATIONS

Dec. 22, 2015 Written Opinion issued in International Patent Application No. PCT/JP2015/005133.
(Continued)

*Primary Examiner* — Michael Leslie
*Assistant Examiner* — Michael Quandt
(74) *Attorney, Agent, or Firm* — Oliff PLC

(57) ABSTRACT

A bi-directional pump connected to a motor by a pair of supply/discharge lines; a regulator changes the bi-directional pump tilting angle; and a controller controls the regulator based on a turning signal outputted from a turning operation valve. At the turning acceleration, at which the signal increases, the controller calculates a motor flow rate passing through the motor and an instruction flow rate determined based on the turning signal. If the instruction flow rate is greater than a reference flow rate obtained by adding a predetermined value to the motor flow rate, the controller controls the regulator so the bi-directional pump tilting angle is adjusted to a tilting angle realizing the reference flow rate. If the instruction flow rate is not greater than the reference flow rate, the controller controls the regulator so the bi-directional pump tilting angle is adjusted to a tilting angle realizing the instruction flow rate.

7 Claims, 9 Drawing Sheets

(51) Int. Cl.
| | |
|---|---|
| E02F 9/12 | (2006.01) |
| F15B 11/02 | (2006.01) |
| F15B 11/08 | (2006.01) |
| F15B 11/10 | (2006.01) |
| F16H 39/42 | (2006.01) |
| F16H 61/4035 | (2010.01) |
| F16H 61/435 | (2010.01) |
| F16H 61/46 | (2010.01) |
| F04B 49/00 | (2006.01) |
| F04B 49/10 | (2006.01) |
| F04B 49/22 | (2006.01) |
| F16H 61/431 | (2010.01) |
| F15B 11/04 | (2006.01) |
| F16H 61/4183 | (2010.01) |
| F16H 61/433 | (2010.01) |
| F15B 7/00 | (2006.01) |

(52) U.S. Cl.
 CPC .......... *E02F 9/2292* (2013.01); *E02F 9/2296* (2013.01); *F04B 49/002* (2013.01); *F04B 49/106* (2013.01); *F04B 49/22* (2013.01); *F15B 11/02* (2013.01); *F15B 11/0406* (2013.01); *F15B 11/08* (2013.01); *F15B 11/10* (2013.01); *F15B 21/14* (2013.01); *F16H 39/42* (2013.01); *F16H 61/4035* (2013.01); *F16H 61/431* (2013.01); *F16H 61/435* (2013.01); *F16H 61/46* (2013.01); *F15B 7/006* (2013.01); *F15B 7/008* (2013.01); *F15B 2211/20553* (2013.01); *F15B 2211/20561* (2013.01); *F15B 2211/20576* (2013.01); *F15B 2211/27* (2013.01); *F15B 2211/50527* (2013.01); *F15B 2211/6316* (2013.01); *F15B 2211/6346* (2013.01); *F15B 2211/6652* (2013.01); *F15B 2211/7058* (2013.01); *F15B 2211/755* (2013.01); *F15B 2211/851* (2013.01); *F15B 2211/853* (2013.01); *F16H 61/4183* (2013.01); *F16H 61/433* (2013.01)

(58) Field of Classification Search
 USPC .......................................................... 60/448
 See application file for complete search history.

(56) References Cited

OTHER PUBLICATIONS

Dec. 22, 2015 Search Report issued in International Patent Application No. PCT/JP2015/005133.

\* cited by examiner

HYDRAULIC DRIVE SYSTEM OF CONSTRUCTION MACHINE

TECHNICAL FIELD

The present invention relates to a hydraulic drive system of a construction machine.

BACKGROUND ART

In construction machines such as hydraulic excavators and hydraulic cranes, the components thereof are driven by a hydraulic drive system. Conventionally, in such a hydraulic drive system, a hydraulic static transmission (HST) is used in a running circuit. In recent years, a hydraulic drive system in which HST is used in a turning circuit has been proposed. For example, Patent Literature 1 discloses a hydraulic drive system 100 as shown in FIG. 9.

In the hydraulic drive system 100, a variable displacement bi-directional pump (also called an over-center pump) 110 is connected to a turning motor 120 by a pair of supply/discharge lines 131 and 132, such that a closed loop is formed. The supply/discharge lines 131 and 132 are connected to each other by a bridging passage 133. The bridging passage 133 is provided with a pair of relief valves 141 and 142, which are directed opposite to each other.

A tank line 134 extends from a part of the bridging passage 133 to a tank, the part being positioned between the relief valve 141 and the relief valve 142. A charge pump 160 is connected to the tank line 134. Hydraulic oil discharged from the charge pump 160 and/or hydraulic oil that has passed through the relief valve (141 or 142) is/are supplied, for replenishment, to one of the supply/discharge lines 131 and 132 via a check valve (151 or 152).

The hydraulic drive system 100 is configured such that a swash plate 111 of the pump 110 is directly moved by pilot pressures a1 and b1 outputted from a turning operation valve 170.

CITATION LIST

Patent Literature

PTL 1: Japanese Laid-Open Patent Application Publication No. 2003-120616

SUMMARY OF INVENTION

Technical Problem

In the hydraulic drive system 100 shown in FIG. 9, there is a case where the energy of the hydraulic oil is lost when an operator moves the operating lever of the turning operation valve 170 fast. For example, when the operating lever is moved from its neutral position to a certain position (at the time of turning acceleration), the swash plate 111 of the pump 110 tilts immediately such that the tilting angle corresponds to the certain position, but the rotation speed of the turning motor does not increase rapidly since the weight (inertia) of the turning unit is great. As a result, a large amount of hydraulic oil flows out of the supply-side supply/discharge line (131 or 132) via the relief valve (141 or 142), the supply-side supply/discharge line leading the hydraulic oil discharged from the pump 110 to the turning motor 120. On the other hand, when the operating lever is returned from a certain position to the neutral position (at the time of turning deceleration), the swash plate 111 of the pump 110 returns to the center immediately, but the rotation speed of the turning motor does not decrease rapidly since the inertial force of the turning unit is significantly great. As a result, a large amount of hydraulic oil flows out of the discharge-side supply/discharge line (132 or 131) via the relief valve (142 or 141), the discharge-side supply/discharge line leading the hydraulic oil discharged from the turning motor 120 to the pump 110.

At the time of turning acceleration, it is conceivable to control the pilot pressures a1 and b1, which are instructions given to the pump 110, so as to prevent the hydraulic oil from flowing out via the relief valve (141 or 142). In this case, however, the pressure of the supply-side supply/discharge line decreases excessively at the time of turning acceleration, resulting in insufficient acceleration (insufficient acceleration torque). Similarly, at the time of turning deceleration, it is conceivable to control the pilot pressures a1 and b1, which are instructions given to the pump 110, so as to prevent the hydraulic oil from flowing out via the relief valve (141 or 142). In this case, however, the pressure of the discharge-side supply/discharge line decreases excessively at the time of turning deceleration, resulting in insufficient deceleration (insufficient braking torque).

In view of the above, an object of the present invention is to provide a hydraulic drive system of a construction machine, the hydraulic drive system being capable of suppressing the loss of energy of the hydraulic oil when the operating lever of the turning operation valve is moved fast, while securing sufficient acceleration or deceleration.

Solution to Problem

In order to solve the above-described problems, a hydraulic drive system of a construction machine according to one aspect of the present invention includes: a turning motor; a variable displacement bi-directional pump connected to the turning motor by a pair of supply/discharge lines, such that a closed loop is formed; a bridging passage connecting the pair of supply/discharge lines to each other and provided with a pair of relief valves that are directed opposite to each other; a regulator that changes a tilting angle of the bi-directional pump; a turning operation valve that receives a turning operation and outputs a turning signal whose magnitude corresponds to an amount of the turning operation; and a controller that controls the regulator based on the turning signal outputted from the turning operation valve. At a time of turning acceleration, at which the turning signal increases, the controller calculates a motor flow rate passing through the turning motor and an instruction flow rate determined based on the turning signal. If the instruction flow rate is greater than a reference flow rate obtained by adding a predetermined value to the motor flow rate, the controller controls the regulator such that the tilting angle of the bi-directional pump is adjusted to a tilting angle that realizes the reference flow rate. If the instruction flow rate is not greater than the reference flow rate, the controller controls the regulator such that the tilting angle of the bi-directional pump is adjusted to a tilting angle that realizes the instruction flow rate.

According to the above-described configuration, even if the turning signal increases rapidly, the tilting angle of the bi-directional pump increases only gradually in conjunction with the motor flow rate. This makes it possible to reduce the amount of hydraulic oil that flows out of a supply-side supply/discharge line via a relief valve, the supply-side supply/discharge line leading the hydraulic oil discharged from the bi-directional pump to the turning motor. Consequently, the loss of energy of the hydraulic oil at the time of turning acceleration can be suppressed. Moreover, since the pressure of the hydraulic oil led to the turning motor does not fall below a setting pressure of the relief valve, sufficient acceleration can be secured.

A hydraulic drive system of a construction machine according to another aspect of the present invention includes: a turning motor; a variable displacement bi-directional pump connected to the turning motor by a pair of supply/discharge lines, such that a closed loop is formed; a supply pump coupled to the bi-directional pump, the supply pump supplying hydraulic oil to an actuator different from the turning motor; a bridging passage connecting the pair of supply/discharge lines to each other and provided with a pair of relief valves that are directed opposite to each other; a regulator that changes a tilting angle of the bi-directional pump; a turning operation valve that receives a turning operation and outputs a turning signal whose magnitude corresponds to an amount of the turning operation; and a controller that controls the regulator based on the turning signal outputted from the turning operation valve. At a time of turning deceleration, at which the turning signal decreases, the controller calculates a motor flow rate passing through the turning motor and an instruction flow rate determined based on the turning signal. If the instruction flow rate is less than a reference flow rate obtained by subtracting a predetermined value from the motor flow rate, the controller controls the regulator such that the tilting angle of the bi-directional pump is adjusted to a tilting angle that realizes the reference flow rate. If the instruction flow rate is not less than the reference flow rate, the controller controls the regulator such that the tilting angle of the bi-directional pump is adjusted to a tilting angle that realizes the instruction flow rate.

According to the above-described configuration, even if the turning signal decreases rapidly, the tilting angle of the bi-directional pump decreases only gradually in conjunction with the motor flow rate. This makes it possible to reduce the amount of hydraulic oil that flows out of a discharge-side supply/discharge line via a relief valve, the discharge-side supply/discharge line leading the hydraulic oil discharged from the turning motor to the bi-directional pump. Consequently, the loss of energy of the hydraulic oil at the time of turning deceleration can be suppressed. Moreover, the bi-directional pump, whose tilting angle decreases only gradually, functions as a motor, and is able to regenerate energy from the hydraulic oil discharged from the turning motor. Such regenerative energy is utilized as driving force for the supply pump. Furthermore, since the pressure of the hydraulic oil discharged from the turning motor does not fall below a setting pressure of the relief valve, sufficient deceleration can be secured.

For example, the bi-directional pump may be a swash plate pump whose swash plate is tiltable from a center to both sides. The regulator may include: a servo mechanism including a servo piston coupled to the swash plate of the bi-directional pump, a first chamber operable to apply hydraulic pressure to one end of the servo piston, and a second chamber operable to apply hydraulic pressure to another end of the servo piston; and a switching valve including a first solenoid and a second solenoid, the switching valve being configured to lead hydraulic oil to the first chamber when an electric current is fed to the first solenoid, and lead hydraulic oil to the second chamber when an electric current is fed to the second solenoid. The controller may feed an electric current to the first solenoid or the second solenoid at a time of turning acceleration, at which the turning signal increases, and at a time of turning deceleration, at which the turning signal decreases, the electric current corresponding to the reference flow rate or the instruction flow rate.

The above hydraulic drive system may further include a charge pump operable to replenish the pair of supply/discharge lines with hydraulic oil. The switching valve may lead the hydraulic oil discharged from the charge pump to the first chamber or the second chamber when the electric current is fed to the first solenoid or the second solenoid. According to this configuration, the discharge pressure of the charge pump can be effectively utilized to drive the servo mechanism.

Advantageous Effects of Invention

According to the present invention, the loss of energy of the hydraulic oil when an operating lever of the turning operation valve is moved fast can be suppressed while securing sufficient acceleration or deceleration. Moreover, since slight outflow of the hydraulic oil via a relief valve is kept at the time of turning acceleration or turning deceleration, the occurrence of vibration, such as hunting, can be prevented.

BRIEF DESCRIPTION OF DRAWINGS

FIG. 4A indicates temporal changes in a left turning pilot pressure Pa; and FIG. 4B indicates temporal changes in an instruction flow rate Qopa, a motor flow rate Qm, a reference flow rate Qr, and a pump target flow rate Qdir.

FIG. 5A indicates energy lost in a hypothetical example; and FIG. 5B indicates energy lost in the embodiment of the present invention.

FIG. 7A indicates temporal changes in the left turning pilot pressure Pa; and FIG. 7B indicates temporal changes in the instruction flow rate Qopa, the motor flow rate Qm, the reference flow rate Qr, and the pump target flow rate Qdir.

FIG. 8A indicates energy lost in a hypothetical example; and FIG. 8B indicates energy lost in the embodiment of the present invention.

DESCRIPTION OF EMBODIMENTS

Figure 1:
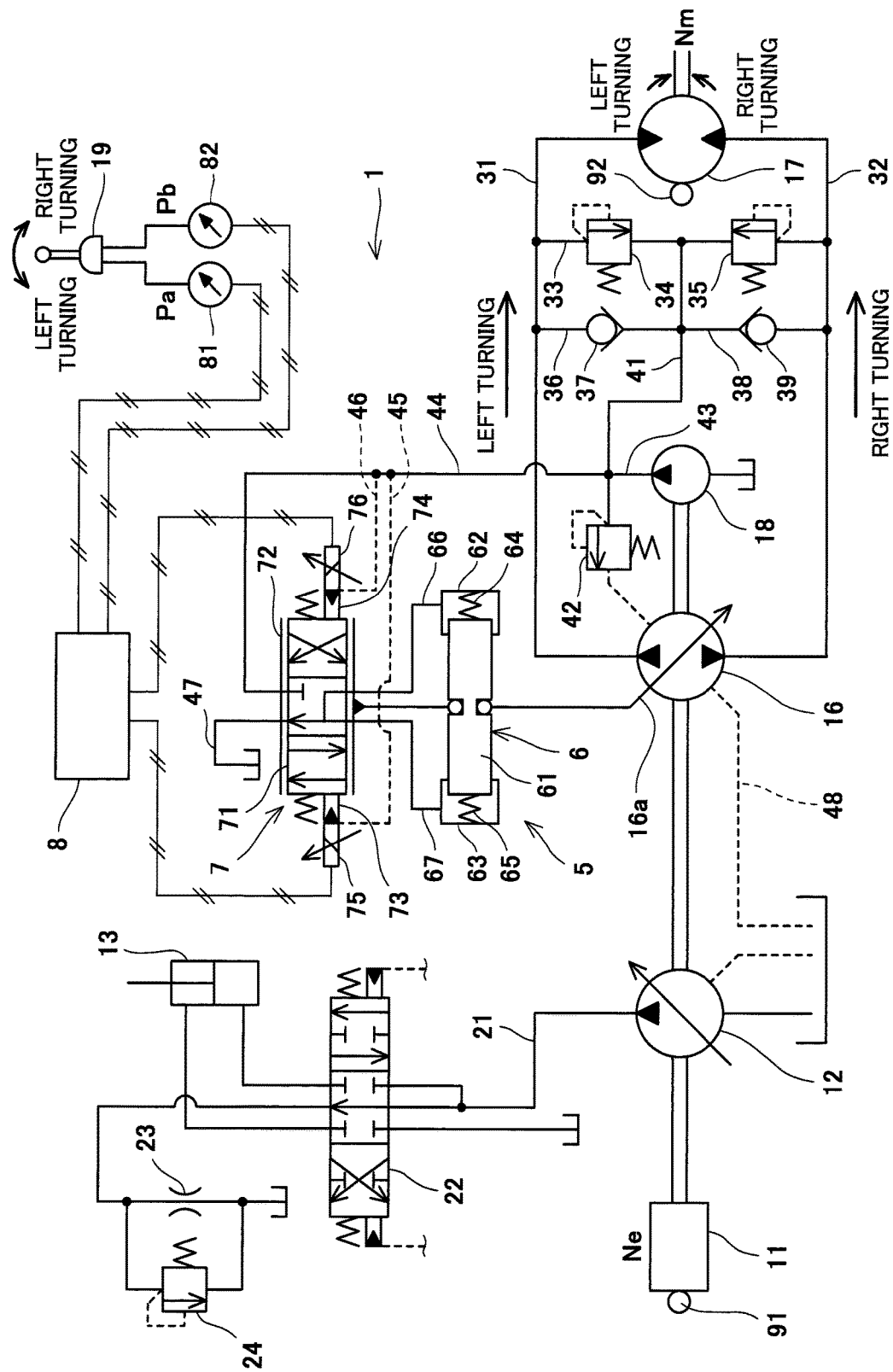
FIG. 1 shows a schematic configuration of a hydraulic drive system according to one embodiment of the present invention.
Figure 2:
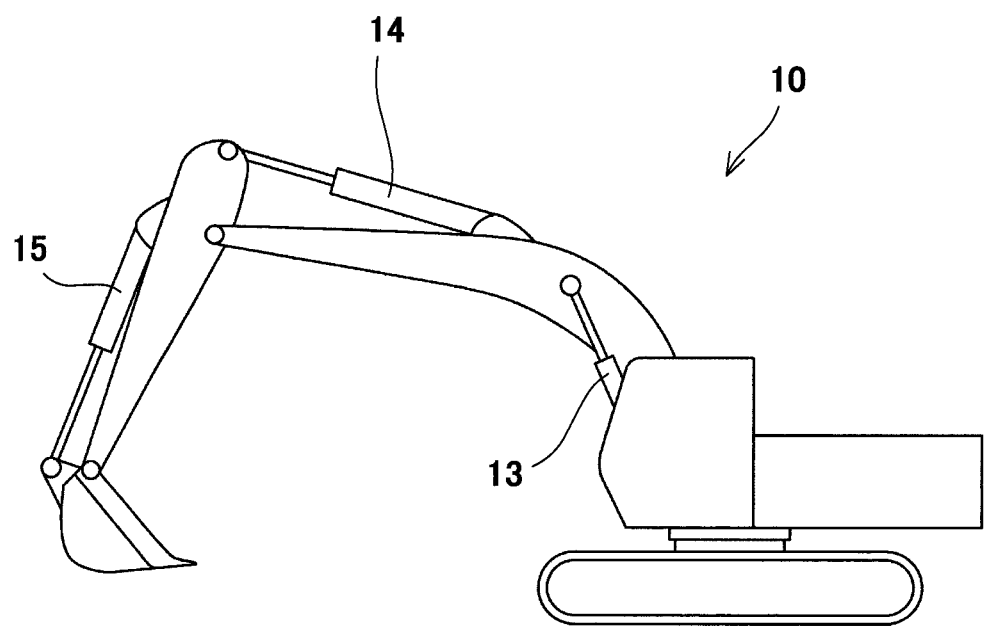
FIG. 2 is a side view of a hydraulic excavator, which is one example of a construction machine.

FIG. 1 shows a hydraulic drive system 1 of a construction machine according to one embodiment of the present invention. FIG. 2 shows a construction machine 10, in which the hydraulic drive system 1 is installed. Although the construction machine 10 shown in FIG. 2 is a hydraulic excavator, the present invention is applicable to other construction machines, such as a hydraulic crane.

The hydraulic drive system 1 includes, as hydraulic actuators, a boom cylinder 13, an arm cylinder 14, and a bucket cylinder 15, which are shown in FIG. 2, and also a turning motor 17 shown in FIG. 1 and a pair of right and left running motors that are not shown. The hydraulic drive system 1 further includes: a bi-directional pump 16 dedicated for the turning motor 17; and a supply pump 12, which supplies hydraulic oil to actuators different from the turning motor 17. It should be noted that, in FIG. 1, actuators other than the turning motor 17 and the boom cylinder 13 are omitted for the purpose of simplifying the drawings.

In the present embodiment, the construction machine 10 is a self-propelled hydraulic excavator. In a case where the construction machine 10 is a hydraulic excavator mounted on a ship, a turning unit including an operator cab is turnably supported by the hull of the ship.

The bi-directional pump 16 and the supply pump 12 are coupled to each other, and the bi-directional pump 16 and the supply pump 12 are coupled to an engine 11. That is, the bi-directional pump 16 and the supply pump 12 are driven by the same engine 11. Accordingly, the rotation speed Ne of the engine 11 is also the rotation speed of the supply pump 12 and the bi-directional pump 16. The rotation speed Ne of the engine 11 is measured by a first rotation speed sensor 91.

The supply pump 12 is a variable displacement pump (a swash plate pump or a bent axis pump) whose tilting angle can be changed. The tilting angle of the supply pump 12 is changed by a regulator that is not shown. In the present embodiment, the discharge flow rate of the supply pump 12 is controlled by negative control. However, as an alternative, the discharge flow rate of the supply pump 12 may be controlled by positive control.

Specifically, a bleed line 21 extends from the supply pump 12 to a tank. On the bleed line 21, a plurality of control valves including a boom control valve 22 are disposed. The boom control valve 22 controls the supply and discharge of hydraulic oil to and from the boom cylinder 13, and the other control valves also control the supply and discharge of hydraulic oil to and from respective actuators. A throttle 23 is provided at the most downstream side of the plurality of control valves on the bleed line 21. A relief valve 24 is disposed on a line that bypasses the throttle 23. The tilting angle of the supply pump 12 is adjusted based on a negative control pressure at the upstream side of the throttle 23 on the bleed line 21.

The bi-directional pump 16 is connected to the turning motor 17 by a pair of supply/discharge lines 31 and 32, such that a closed loop is formed. The rotation speed Nm of the turning motor 17 is measured by a second rotation speed sensor 92.

The bi-directional pump 16 is a variable displacement pump whose tilting angle can be changed. The tilting angle of the bi-directional pump 16 is changed by a regulator 5. In the present embodiment, the bi-directional pump 16 is a swash plate pump whose swash plate 16a is tiltable from the center to both sides. That is, the angle of the swash plate 16a with respect to the center is the tilting angle of the bi-directional pump 16. The swash plate 16a is moved by the regulator 5. The regulator 5 will be described below in detail. It should be noted that the bi-directional pump 16 may be a bent axis pump whose tilted axis is tiltable from the center to both sides.

In the aforementioned closed loop of the present embodiment, the hydraulic oil flows clockwise in FIG. 1 at the time of left turning, and the hydraulic oil flows counterclockwise in FIG. 1 at the time of right turning. That is, at the time of left turning, the supply/discharge line 31 serves as the supply-side line that leads the hydraulic oil discharged from the bi-directional pump 16 to the turning motor 17, and the supply/discharge line 32 serves as the discharge-side line that leads the hydraulic oil discharged from the turning motor 17 to the bi-directional pump 16. On the other hand, at the time of right turning, the supply/discharge line 32 serves as the supply-side line that leads the hydraulic oil discharged from the bi-directional pump 16 to the turning motor 17, and the supply/discharge line 31 serves as the discharge-side line that leads the hydraulic oil discharged from the turning motor 17 to the bi-directional pump 16.

The supply/discharge lines 31 and 32 are connected to each other by a bridging passage 33. The bridging passage 33 is provided with a pair of relief valves 34 and 35, which are directed opposite to each other. A part of the bridging passage 33, the part being positioned between the relief valves 34 and 35, is connected to a relief valve 42 by a relief line 41.

The setting pressure of the relief valve 42 is set to be sufficiently lower than the setting pressure of the relief valves 34 and 35 provided on the bridging passage 33. A tank line 48 extends from the relief valve 42 to the tank. In the present embodiment, the tank line 48 doubles as a drain line of the bi-directional pump 16.

The supply/discharge lines 31 and 32 are connected to the relief line 41 by bypass lines 36 and 38, respectively. The bypass lines 36 and 38 may be provided on the bridging passage 33 in a manner to bypass the relief valves 34 and 35, respectively. The bypass lines 36 and 38 are provided with check valves 37 and 39, respectively.

Further, the relief line 41 is connected to a charge pump 18 by a replenishment line 43. The charge pump 18 is operable to replenish the supply/discharge lines 31 and 32 with the hydraulic oil via the check valves 37 and 39, respectively. The charge pump 18 is coupled to the bi-directional pump 16, and is driven by the engine 11. It should be noted that the charge pump 18 may be directly coupled to the engine 11.

The aforementioned regulator 5, which moves the swash plate 16a of the bi-directional pump 16, is controlled by a controller 8. The operator cab of the construction machine 10 includes a turning operation valve 19, which receives a turning operation by an operator. The turning operation valve 19 includes an operating lever, and outputs a turning signal whose magnitude corresponds to the amount of the turning operation received by the turning operation valve 19 (i.e., corresponds to the angle of the operating lever). The controller 8 controls the regulator 5 based on the turning signal outputted from the turning operation valve 19.

In the present embodiment, the turning operation valve 19 outputs, as the turning signal, a pilot pressure whose magnitude corresponds to the angle of the operating lever (a left turning pilot pressure Pa or a right turning pilot pressure Pb). The left turning pilot pressure Pa is measured by a first pressure meter 81, and the right turning pilot pressure Pb is measured by a second pressure meter 82. The measured left turning pilot pressure Pa and right turning pilot pressure Pb are sent to the controller 8. Alternatively, the turning operation valve 19 may directly output an electrical signal whose magnitude corresponds to the angle of the operating lever to the controller 8 as the turning signal.

Specifically, the regulator 5 includes a servo mechanism 6 and a switching valve 7. The servo mechanism 6 includes: a servo piston 61 coupled to the swash plate 16a of the bi-directional pump 16; a first chamber 62 operable to apply hydraulic pressure to one end (in FIG. 1, right end) of the servo piston 61; a second chamber 63 operable to apply hydraulic pressure to the other end (in FIG. 1, left end) of the servo piston 61. A spring 64 and a spring 65 are disposed in the first chamber 62 and the second chamber 63, respectively. The springs 64 and 65 exert urging force onto the servo piston 61 from opposite directions.

When the pressure in the first chamber 62 and the pressure in the second chamber 63 are both zero, the servo piston 61 is kept at its neutral position due to the urging force of the springs 64 and 65. At the neutral position, the angle of the swash plate 16a (the tilting angle of the bi-directional pump 16) is zero. When the hydraulic oil is pressure-fed into the first chamber 62, the servo piston 61 moves to the left against the urging force of the left spring 65, and the swash plate 16a moves in such a direction that the bi-directional pump 16 discharges the hydraulic oil to the supply/discharge line 31. That is, the first chamber 62 is a chamber intended for left turning. When the hydraulic oil is pressure-fed into the second chamber 63, the servo piston 61 moves to the right against the urging force of the right spring 65, and the swash plate 16a moves in such a direction that the bi-directional pump 16 discharges the hydraulic oil to the supply/discharge line 32. That is, the second chamber 63 is a chamber intended for right turning.

The switching valve 7 is connected to the first and second chambers 62 and 63 of the servo mechanism 6 by a pair of servo lines 66 and 67, respectively. The switching valve 7 is connected to the charge pump 18 by a pressure source line 44 and the aforementioned replenishment line 43. Further, a tank line 47 extends from the switching valve 7 to the tank.

The switching valve 7 includes: a sleeve 72 coupled to the servo piston 61; and a spool 71 disposed in the sleeve 72. When the spool 71 is positioned at its neutral position, the spool 71 blocks the pressure source line 44, and allows the servo lines 66 and 67 to be in communication with the tank line 47. When the spool 71 moves to the right in FIG. 1, the right servo line 66 comes into communication with the pressure source line 44, and also, the left servo line 67 comes into communication with the tank line 47. As a result, the hydraulic oil discharged from the charge pump 18 is led to the first chamber 62, and the servo piston 61 moves to the left. On the other hand, when the spool 71 moves to the left in FIG. 1, the left servo line 67 comes into communication with the pressure source line 44, and also, the right servo line 66 comes into communication with the tank line 47. As a result, the hydraulic oil discharged from the charge pump 18 is led to the second chamber 63, and the servo piston 61 moves to the right.

The switching valve 7 further includes: a first solenoid 75, which is fed with an electric current from the controller 8 and moves the spool 71 to the right in FIG. 1 at the time of left turning (i.e., when the left turning pilot pressure Pa>0); and a second solenoid 76, which is fed with an electric current from the controller 8 and moves the spool 71 to the left in FIG. 1 at the time of right turning (i.e., when the right turning pilot pressure Pb>0). The switching valve 7 further includes pilot ports 73 and 74 for assisting the movement of the spool 71. The pilot ports 73 and 74 are connected to the pressure source line 44 by pilot lines 45 and 46, respectively.

Figure 3:
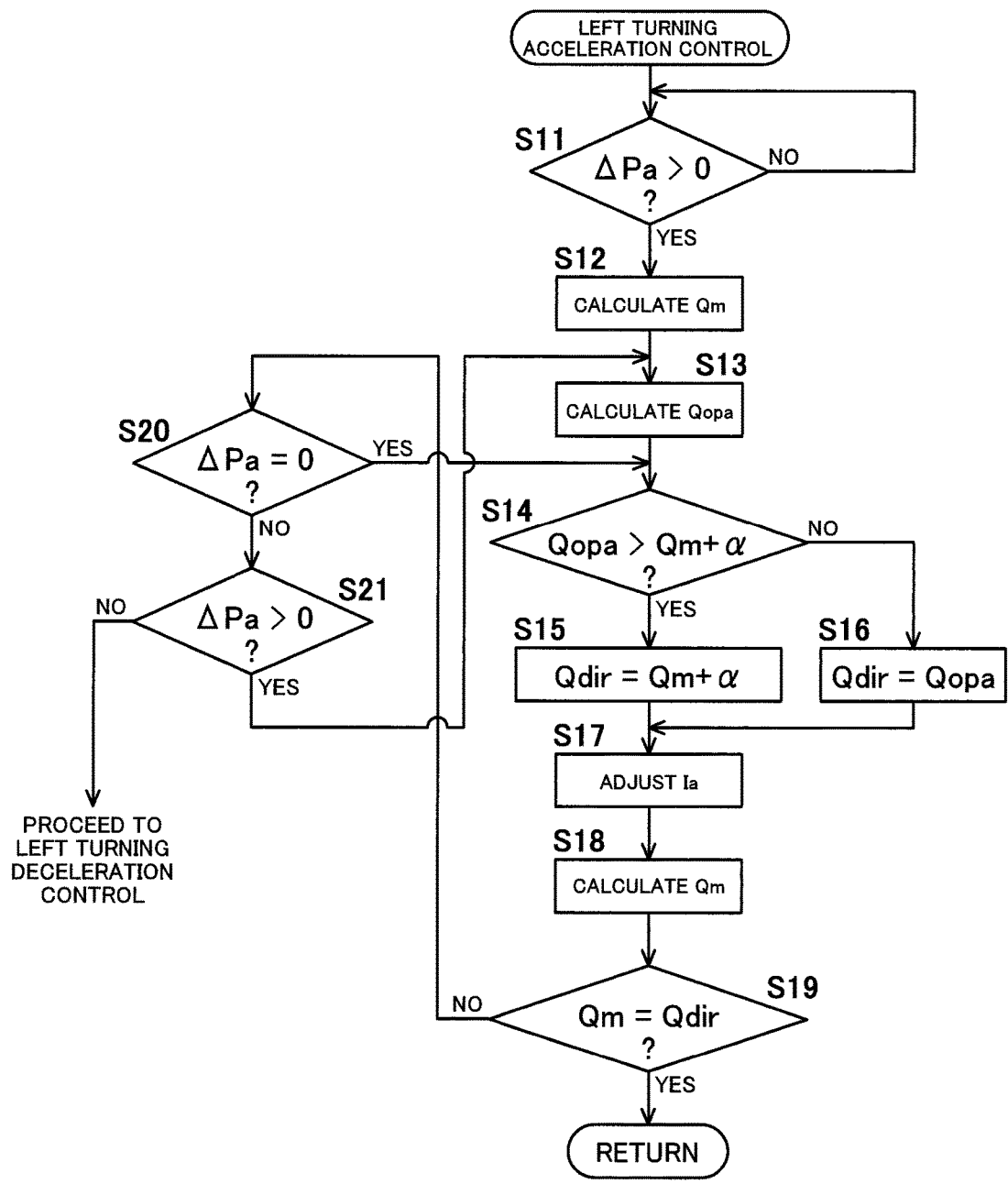
FIG. 3 is a flowchart of left turning acceleration control.
Figure 6:
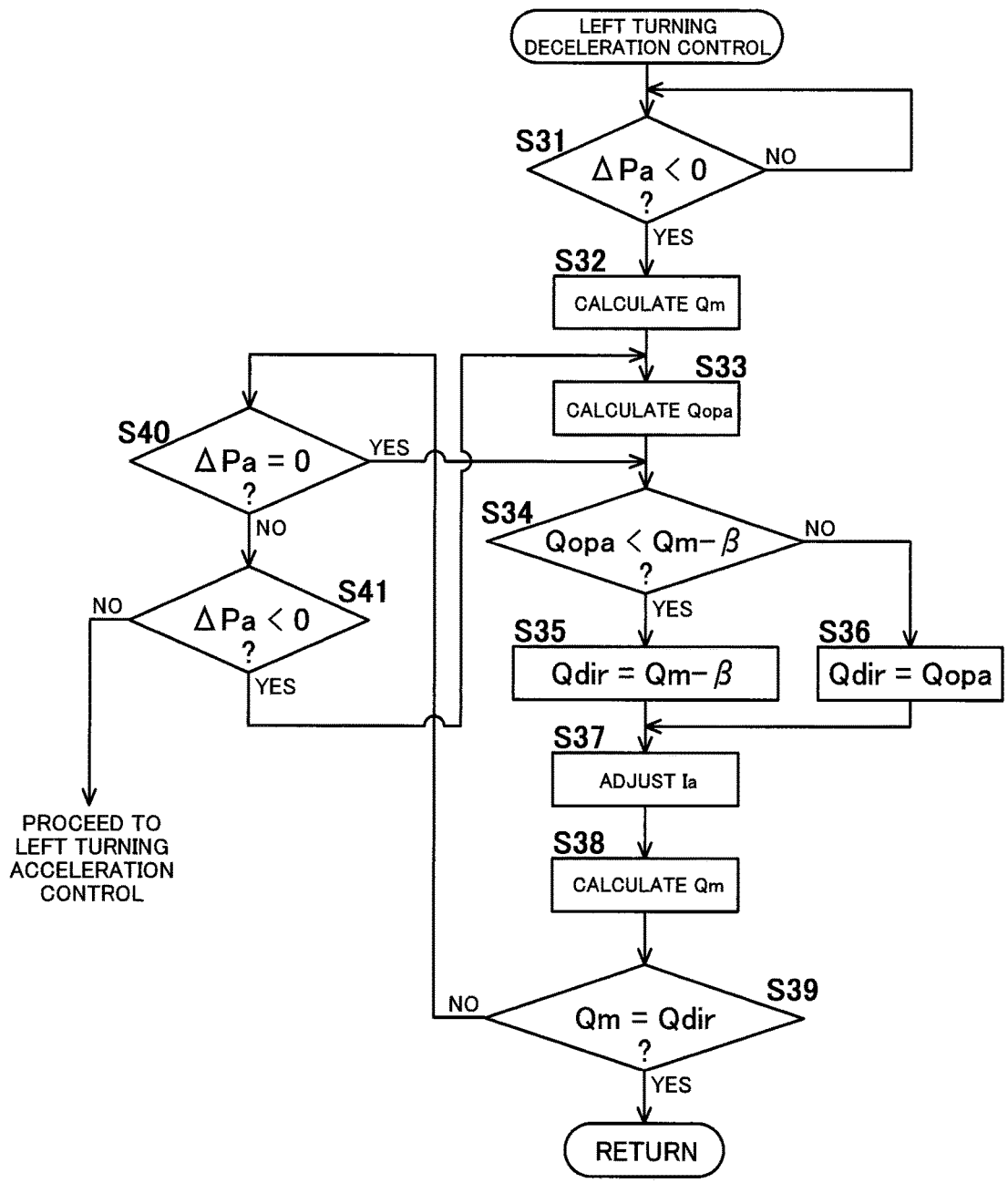
FIG. 6 is a flowchart of left turning deceleration control.

The rotation speed Ne of the engine 11, which is measured by the first rotation speed sensor 91, and the rotation speed Nm of the turning motor 17, which is measured by the second rotation speed sensor 92, are sent to the controller 8. In the present embodiment, the controller 8 performs both: turning acceleration control of controlling the regulator 5 as shown in FIG. 3 at the time of turning acceleration, at which the pilot pressure increases; and turning deceleration control of controlling the regulator 5 as shown in FIG. 6 at the time of turning deceleration, at which the pilot pressure decreases. However, as an alternative, the controller 8 may perform only one of the turning acceleration control as shown in FIG. 3 or the turning deceleration control as shown in FIG. 6. Hereinafter, the turning acceleration control and the turning deceleration control at the time of left turning are described in detail. It is of course understood that the turning acceleration control and the turning deceleration control at the time of right turning are also performed in the same manner.

<Left Turning Acceleration Control>

FIG. 3 is a flowchart of left turning acceleration control. The controller 8 starts the left turning acceleration control when a temporal change rate ΔPa of the left turning pilot pressure Pa is higher than zero (YES in step S11).

First, the controller 8 multiplies the motor capacity Vm of the turning motor 17 by the rotation speed Nm of the turning motor 17, thereby calculating a motor flow rate Qm passing through the turning motor 17 (step S12). Then, the controller 8 calculates an instruction flow rate Qopa, which is determined based on the left turning pilot pressure Pa (step S13).

The calculation of the instruction flow rate Qopa is, for example, performed in the following manner. First, the controller 8 determines a pump instruction capacity Vopa corresponding to the left turning pilot pressure Pa. For example, the left turning pilot pressure Pa and the pump instruction capacity Vopa are proportional. Then, the controller 8 multiplies the pump instruction capacity Vopa by the rotation speed of the bi-directional pump 16 (in the present embodiment, the rotation speed Ne of the engine 11), thereby calculating the instruction flow rate Qopa.

Thereafter, the controller 8 compares the instruction flow rate Qopa with a reference flow rate Qr (Qr=Qm+α), which is obtained by adding a predetermined value α to the motor flow rate Qm (step S14). The predetermined value α herein is a necessary flow rate for opening the relief valve 34 assuredly. In the present embodiment, the predetermined value α is a constant value. However, the predetermined value α may be, for example, a parameter that changes in accordance with the temperature of the hydraulic oil.

If the instruction flow rate Qopa is greater than the reference flow rate Qr (YES in step S14), a pump target flow rate Qdir is set as the reference flow rate Qr (step S15). On the other hand, if the instruction flow rate Qopa is not greater than the reference flow rate Qr (NO in step S14), the pump target flow rate Qdir is set as the instruction flow rate Qopa (step S16).

After the pump target flow rate Qdir is set, the controller 8 determines an electric current Ia corresponding to the pump target flow rate Qdir, and feeds the electric current Ia to the first solenoid 75 (step S17).

To be more specific, if the pump target flow rate Qdir is set as the reference flow rate Qr in step S15, the controller 8 feeds an electric current Ia corresponding to the reference flow rate Qr to the first solenoid 75. Specifically, the controller 8 divides the reference flow rate Qr by the rotation speed of the bi-directional pump 16 (in the present embodiment, the rotation speed Ne of the engine 11), thereby calculating a pump target capacity. Vdir, and determines such an electric current Ia that the tilting angle of the bi-directional pump 16 is adjusted to a tilting angle that achieves the pump target capacity Vdir. As a result of feeding such an electric current Ia to the first solenoid 75, the tilting angle of the bi-directional pump 16 is adjusted to the tilting angle that realizes the reference flow rate Qr.

On the other hand, if the pump target flow rate Qdir is set as the instruction flow rate Qopa in step S16, the controller 8 feeds an electric current Ia corresponding to the instruction flow rate Qopa to the first solenoid 75. Specifically, the controller 8 divides the instruction flow rate Qopa by the rotation speed of the bi-directional pump 16 (in the present embodiment, the rotation speed Ne of the engine 11), thereby calculating the pump target capacity Vdir, and determines such an electric current Ia that the tilting angle of the bi-directional pump 16 is adjusted to a tilting angle that achieves the pump target capacity Vdir. As a result of feeding such an electric current Ia to the first solenoid 75, the tilting angle of the bi-directional pump 16 is adjusted to the tilting angle that realizes the instruction flow rate Qopa.

Thereafter, the controller 8 calculates the motor flow rate Qm again (step S18), and determines whether the motor flow rate Qm has increased to be equal to the pump target flow rate Qdir (step S19). If it is determined YES in step S19, the controller 8 ends the left turning acceleration control. On the other hand, if it is determined NO in step S19, the flow returns to step S14 if the temporal change rate ΔPa of the left turning pilot pressure Pa is zero (YES in step S20), or returns to step S13 if the ΔPa is greater than zero (NO in step S20 and YES in step S21), or proceeds to left turning deceleration control, which will be described below, if the ΔPa is less than zero (NO in step S21).

According to the above-described left turning acceleration control, even if the left turning pilot pressure Pa increases rapidly, the tilting angle of the bi-directional pump 16 increases only gradually in conjunction with the motor flow rate Qm. This makes it possible to reduce the amount of hydraulic oil that flows out of the supply-side supply/discharge line 31 via the relief valve 34. Consequently, the loss of energy of the hydraulic oil at the time of left turning acceleration can be suppressed.

Figure 4A:
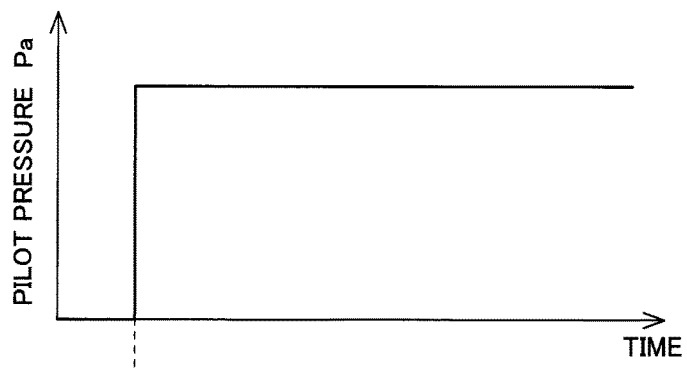
FIGS. 4A and 4B are graphs each indicating temporal changes at the time of left turning acceleration.
Figure 4B:
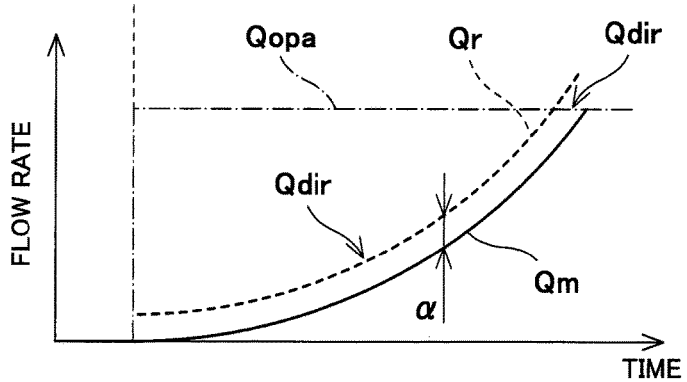
Figure 5A:
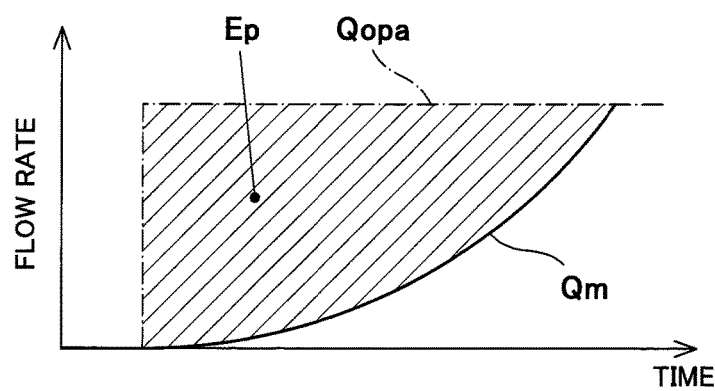
FIGS. 5A and 5B are graphs each indicating energy lost at the time of left turning acceleration.
Figure 5B:
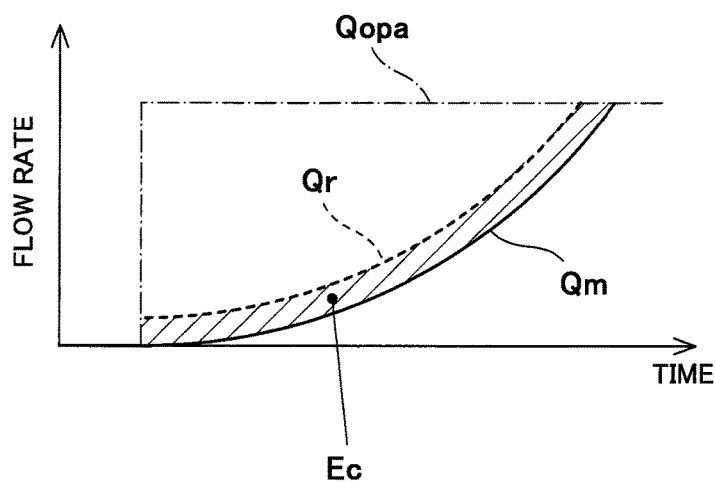

For example, when the operating lever of the turning operation valve 19 is moved instantaneously from the neutral position in the left-turning direction as shown in FIG. 4A, the instruction flow rate Qopa shifts substantially in the same manner as the left turning pilot pressure Pa as shown in FIG. 4B, but the pump target flow rate Qdir for determining the tilting angle of the bi-directional pump 16 increases only gradually in conjunction with the motor flow rate Qm. Thus, if the swash plate 16a is moved in conjunction with the left turning pilot pressure Pa in a manner similar to the conventional art, energy Ep with a large area as shown in FIG. 5A is lost. On the other hand, in the present embodiment, the area of lost energy Ec is significantly small as shown in FIG. 5B.

Moreover, since the pressure of the hydraulic oil led to the turning motor 17 at the time of left turning acceleration does not fall below the setting pressure of the relief valve 34, sufficient acceleration can be secured. Furthermore, the above-described left turning acceleration control allows the relief valve 34 to move stably. Thus, acceleration and movement stability can be secured at the same level as the conventional art.

It is of course understood that, also at the time of right turning, the same advantages as those described above are obtained by performing control in the same manner as that of FIG. 3.

<Left Turning Deceleration Control>

FIG. 6 is a flowchart of left turning deceleration control. The controller 8 starts the left turning deceleration control when the temporal change rate ΔPa of the left turning pilot pressure Pa is less than zero (YES in step S31).

First, the controller 8 multiplies the motor capacity Vm of the turning motor 17 by the rotation speed Nm of the turning motor 17, thereby calculating a motor flow rate Qm passing through the turning motor 17 (step S32). Then, the controller 8 calculates an instruction flow rate Qopa, which is determined based on the left turning pilot pressure Pa (step S33). The calculation of the instruction flow rate Qopa is performed in the same manner as in the left turning acceleration control.

Thereafter, the controller 8 compares the instruction flow rate Qopa with a reference flow rate Qr (Qr=Qm−β), which is obtained by subtracting a predetermined value β from the motor flow rate Qm (step S34). The predetermined value β herein is a necessary flow rate for opening the relief valve 34 assuredly. In the present embodiment, the predetermined value β is a constant value. The predetermined value β may be the same as or different from the predetermined value α used in the left turning acceleration control. It should be noted that the predetermined value β may be, for example, a parameter that changes in accordance with the temperature of the hydraulic oil.

If the instruction flow rate Qopa is less than the reference flow rate Qr (YES in step S34), a pump target flow rate Qdir is set as the reference flow rate Qr (step S35). On the other hand, if the instruction flow rate Qopa is not less than the reference flow rate Qr (NO in step S34), the pump target flow rate Qdir is set as the instruction flow rate Qopa (step S36).

After the pump target flow rate Qdir is set, the controller 8 determines an electric current Ia corresponding to the pump target flow rate Qdir, and feeds the electric current Ia to the first solenoid 75 (step S37).

To be more specific, if the pump target flow rate Qdir is set as the reference flow rate Qr in step S35, the controller 8 feeds an electric current Ia corresponding to the reference flow rate Qr to the first solenoid 75. Specifically, the controller 8 divides the reference flow rate Qr by the rotation speed of the bi-directional pump 16 (in the present embodiment, the rotation speed Ne of the engine 11), thereby calculating a pump target capacity Vdir, and determines such an electric current Ia that the tilting angle of the bi-directional pump 16 is adjusted to a tilting angle that achieves the pump target capacity Vdir. As a result of feeding such an electric current Ia to the first solenoid 75, the tilting angle of the bi-directional pump 16 is adjusted to the tilting angle that realizes the reference flow rate Qr.

On the other hand, if the pump target flow rate Qdir is set as the instruction flow rate Qopa in step S36, the controller 8 feeds an electric current Ia corresponding to the instruction flow rate Qopa to the first solenoid 75. Specifically, the controller 8 divides the instruction flow rate Qopa by the rotation speed of the bi-directional pump 16 (in the present embodiment, the rotation speed Ne of the engine 11), thereby calculating the pump target capacity Vdir, and determines such an electric current Ia that the tilting angle of the bi-directional pump 16 is adjusted to a tilting angle that achieves the pump target capacity Vdir. As a result of feeding such an electric current Ia to the first solenoid 75, the tilting angle of the bi-directional pump 16 is adjusted to the tilting angle that realizes the instruction flow rate Qopa.

Thereafter, the controller 8 calculates the motor flow rate Qm again (step S38), and determines whether the motor flow rate Qm has decreased to be equal to the pump target flow rate Qdir (step S39). If it is determined YES in step S39, the controller 8 ends the left turning deceleration control. On the other hand, if it is determined NO in step S39, the flow returns to step S34 if the temporal change rate ΔPa of the left turning pilot pressure Pa is zero (YES in step S40), or returns to step S33 if the ΔPa is less than zero (NO in step S40 and YES in step S41), or proceeds to the above-described left turning acceleration control if the ΔPa is greater than zero (NO in step S41).

According to the above-described left turning deceleration control, even if the left turning pilot pressure Pa decreases rapidly, the tilting angle of the bi-directional pump 16 decreases only gradually in conjunction with the motor flow rate Qm. This makes it possible to reduce the amount of hydraulic oil that flows out of the discharge-side supply/discharge line 32 via the relief valve 35. Consequently, the loss of energy of the hydraulic oil at the time of turning deceleration can be suppressed. Moreover, the bi-directional pump 16, whose tilting angle decreases only gradually, functions as a motor, and is able to regenerate energy from the hydraulic oil discharged from the turning motor 17. Such regenerative energy is utilized as driving force for the supply pump 12.

Figure 7A:
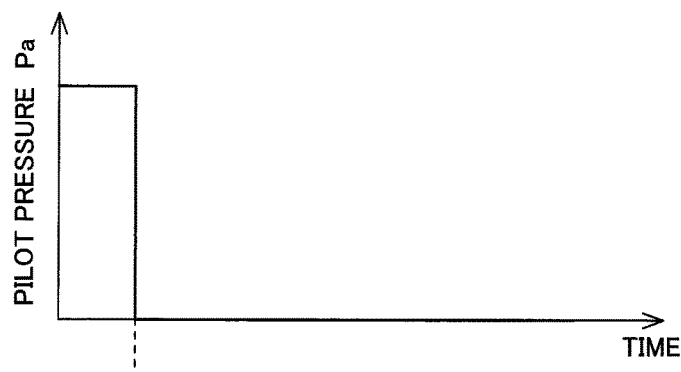
FIGS. 7A and 7B are graphs each indicating temporal changes at the time of left turning deceleration.
Figure 7B:
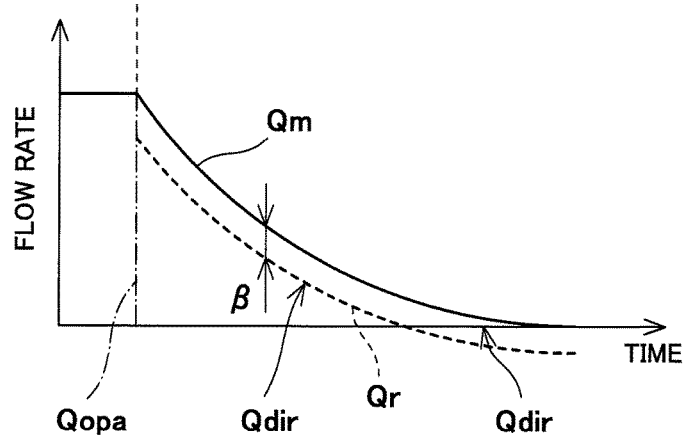
Figure 8A:
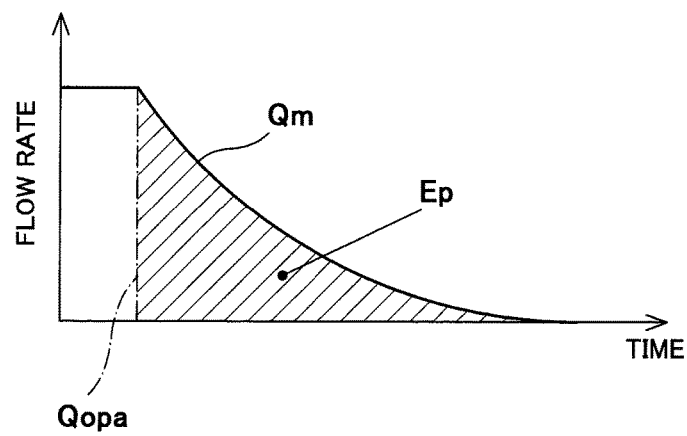
FIGS. 8A and 8B are graphs each indicating energy lost at the time of left turning deceleration.
Figure 8B:
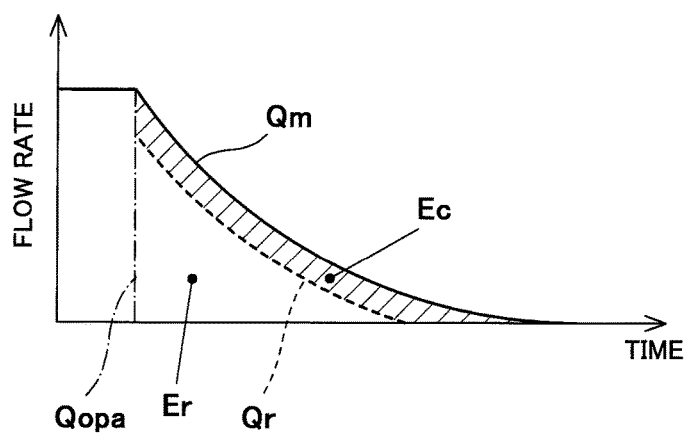
Figure 9:
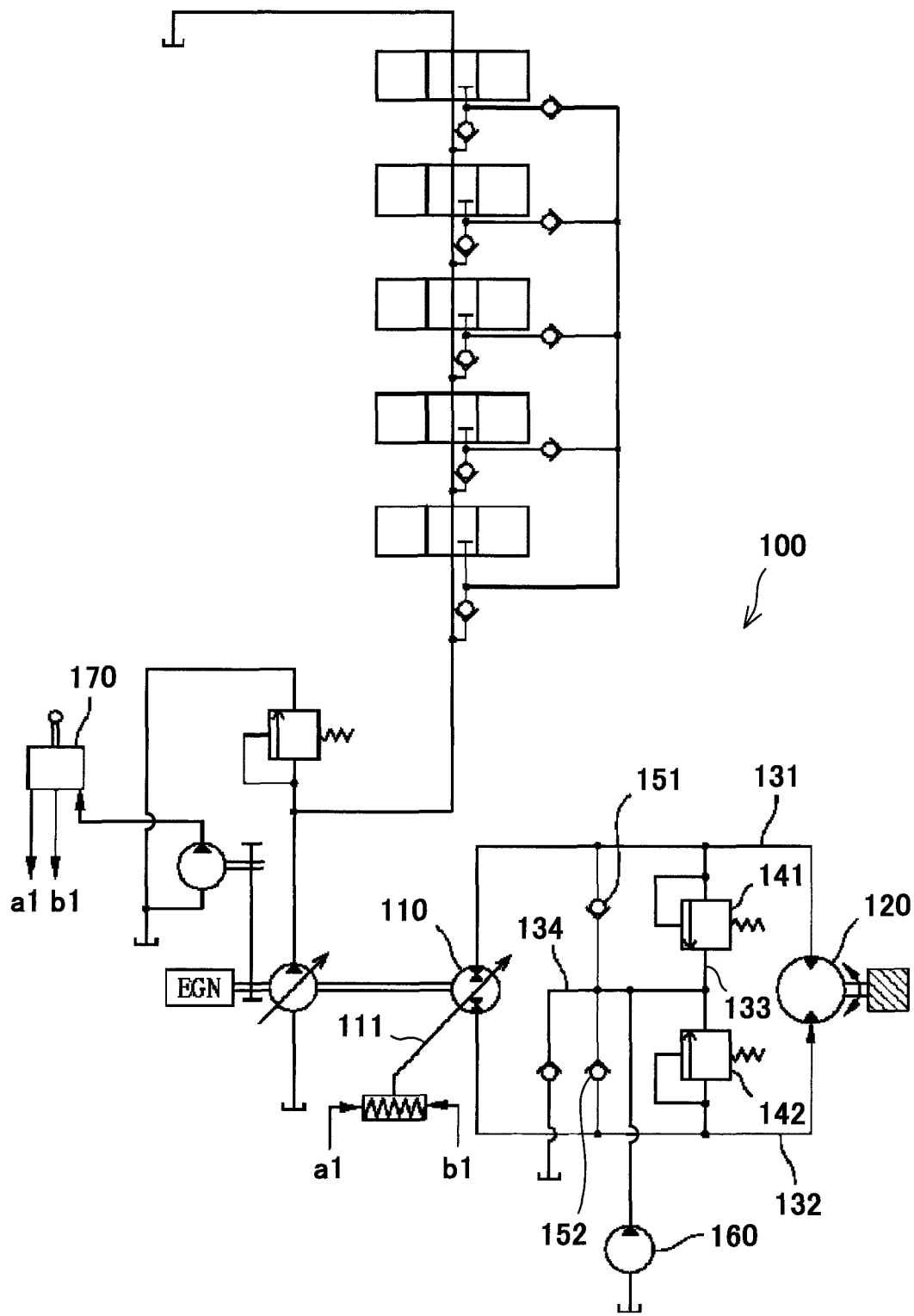
FIG. 9 shows a schematic configuration of a hydraulic drive system of a conventional construction machine.

For example, when the operating lever of the turning operation valve 19 is moved instantaneously from a certain left-turning position to the neutral position as shown in FIG. 7A, the instruction flow rate Qopa shifts substantially in the same manner as the left turning pilot pressure Pa as shown in FIG. 7B, but the pump target flow rate Qdir for determining the tilting angle of the bi-directional pump 16 decreases only gradually in conjunction with the motor flow rate Qm. Thus, if the swash plate 16a is moved in conjunction with the left turning pilot pressure Pa in a manner similar to the conventional art, energy Ep with a large area as shown in FIG. 8A is lost. On the other hand, in the present embodiment, the area of lost energy Ec is significantly small as shown in FIG. 8B, because energy Er, which is the remaining energy when subtracting the lost energy Ec from the energy Ep, can be regenerated.

Moreover, since the pressure of the hydraulic oil discharged from the turning motor 17 at the time of left turning deceleration does not fall below the setting pressure of the relief valve 35, sufficient deceleration can be secured. Furthermore, the above-described left turning deceleration control allows the relief valve 35 to move stably. Thus, deceleration and movement stability can be secured at the same level as the conventional art.

It is of course understood that, also at the time of right turning, the same advantages as those described above are obtained by performing control in the same manner as that of FIG. 6.

(Other Embodiments)

The present invention is not limited to the above-described embodiment. Various modifications can be made without departing from the spirit of the present invention.

REFERENCE SIGNS LIST 1 hydraulic drive system
10 construction machine
12 supply pump
13 boom cylinder (actuator different from a turning motor)
16 bi-directional pump
16a swash plate
17 turning motor
18 charge pump
19 turning operation valve
31, 32 supply/discharge line
33 bridging passage
34, 35 relief valve
5 regulator
6 servo mechanism
61 servo piston
62 first chamber
63 second chamber
7 switching valve
75 first solenoid
76 second solenoid
8 controller

The invention claimed is:

1. A hydraulic drive system of a construction machine, comprising:
a turning motor;
a variable displacement bi-directional pump connected to the turning motor by a pair of supply/discharge lines, such that a closed loop is formed;
a bridging passage connecting the pair of supply/discharge lines to each other and provided with a pair of relief valves that are directed opposite to each other;
a regulator that changes a tilting angle of the bi-directional pump;
a turning operation valve that receives a turning operation and outputs a turning signal whose magnitude corresponds to an amount of the turning operation; and
a controller that controls the regulator based on the turning signal outputted from the turning operation valve, wherein
at a time of turning acceleration, at which the turning signal increases, the controller calculates a motor flow rate passing through the turning motor and an instruction flow rate determined based on the turning signal,
if the instruction flow rate is greater than a reference flow rate obtained by adding a predetermined value to the motor flow rate, the controller controls the regulator such that the tilting angle of the bi-directional pump is adjusted to a tilting angle that realizes the reference flow rate, and
if the instruction flow rate is not greater than the reference flow rate, the controller controls the regulator such that the tilting angle of the bi-directional pump is adjusted to a tilting angle that realizes the instruction flow rate.

2. The hydraulic drive system of a construction machine according to claim 1, further comprising a supply pump coupled to the bi-directional pump, the supply pump supplying hydraulic oil to an actuator different from the turning motor, wherein
at a time of turning deceleration, at which the turning signal decreases, the controller calculates a motor flow rate passing through the turning motor and an instruction flow rate determined based on the turning signal,
if the instruction flow rate is less than a reference flow rate obtained by subtracting a predetermined value from the motor flow rate, the controller controls the regulator such that the tilting angle of the bi-directional pump is adjusted to a tilting angle that realizes the reference flow rate, and
if the instruction flow rate is not less than the reference flow rate, the controller controls the regulator such that the tilting angle of the bi-directional pump is adjusted to a tilting angle that realizes the instruction flow rate.

3. The hydraulic drive system of a construction machine according to claim 1, wherein
the bi-directional pump is a swash plate pump whose swash plate is tiltable from a center to both sides,
the regulator includes:
a servo mechanism including a servo piston coupled to the swash plate of the bi directional pump, a first chamber operable to apply hydraulic pressure to one end of the servo piston, and a second chamber operable to apply hydraulic pressure to another end of the servo piston; and a switching valve including a first solenoid and a second solenoid, the switching valve being configured to lead hydraulic oil to the first chamber when an electric current is fed to the first solenoid, and lead hydraulic oil to the second chamber when an electric current is fed to the second solenoid, and the controller feeds an electric current to the first solenoid or the second solenoid at a time of turning acceleration, at which the turning signal increases, the electric current corresponding to the reference flow rate or the instruction flow rate.

4. The hydraulic drive system of a construction machine according to claim 3, further comprising a charge pump operable to replenish the pair of supply/discharge lines with hydraulic oil, wherein the switching valve leads the hydraulic oil discharged from the charge pump to the first chamber or the second chamber when the electric current is fed to the first solenoid or the second solenoid.

5. A hydraulic drive system of a construction machine, comprising:

a turning motor;

a variable displacement bi-directional pump connected to the turning motor by a pair of supply/discharge lines, such that a closed loop is formed;

a supply pump coupled to the bi-directional pump, the supply pump supplying hydraulic oil to an actuator different from the turning motor;

a bridging passage connecting the pair of supply/discharge lines to each other and provided with a pair of relief valves that are directed opposite to each other;

a regulator that changes a tilting angle of the bi-directional pump;

a turning operation valve that receives a turning operation and outputs a turning signal whose magnitude corresponds to an amount of the turning operation; and a controller that controls the regulator based on the turning signal outputted from the turning operation valve, wherein at a time of turning deceleration, at which the turning signal decreases, the controller calculates a motor flow rate passing through the turning motor and an instruction flow rate determined based on the turning signal, if the instruction flow rate is less than a reference flow rate obtained by subtracting a predetermined value from the motor flow rate, the controller controls the regulator such that the tilting angle of the bi-directional pump is adjusted to a tilting angle that realizes the reference flow rate, and if the instruction flow rate is not less than the reference flow rate, the controller controls the regulator such that the tilting angle of the bi-directional pump is adjusted to a tilting angle that realizes the instruction flow rate.

6. The hydraulic drive system of a construction machine according to claim 5, wherein the bi-directional pump is a swash plate pump whose swash plate is tiltable from a center to both sides, the regulator includes:

a servo mechanism including a servo piston coupled to the swash plate of the bi directional pump, a first chamber operable to apply hydraulic pressure to one end of the servo piston, and a second chamber operable to apply hydraulic pressure to another end of the servo piston; and a switching valve including a first solenoid and a second solenoid, the switching valve being configured to lead hydraulic oil to the first chamber when an electric current is fed to the first solenoid, and lead hydraulic oil to the second chamber when an electric current is fed to the second solenoid, and the controller feeds an electric current to the first solenoid or the second solenoid at a time of turning deceleration, at which the turning signal decreases, the electric current corresponding to the reference flow rate or the instruction flow rate.

7. The hydraulic drive system of a construction machine according to claim 6, further comprising a charge pump operable to replenish the pair of supply/discharge lines with hydraulic oil, wherein the switching valve leads the hydraulic oil discharged from the charge pump to the first chamber or the second chamber when the electric current is fed to the first solenoid or the second solenoid.

* * * * *